Jan. 12, 1932.   W. DÄMMRICH   1,840,658
EGG YOLK SEPARATOR
Filed Dec. 31, 1930
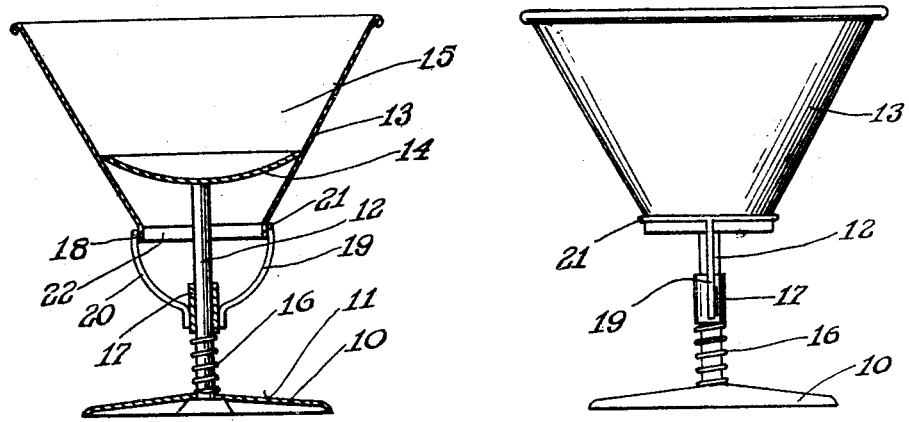
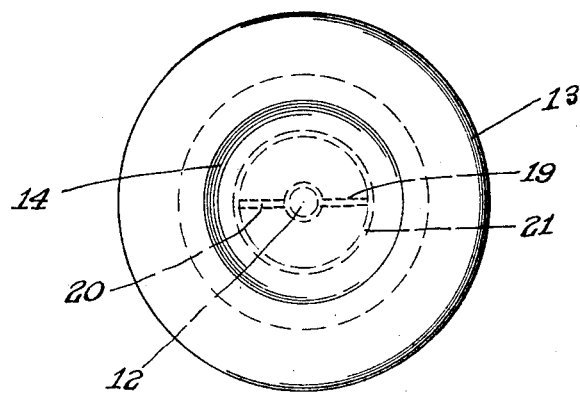
INVENTOR
W. Dämmrich
BY HIS ATTORNEY Patented Jan. 12, 1932

1,840,658

UNITED STATES PATENT OFFICE

WALTER DÄMMRICH, OF GRASSMERE, NEW YORK

EGG YOLK SEPARATOR

Application filed December 31, 1930. Serial No. 505,811.

The main object of this invention is to provide a device by means of which the yolk may be completely separated from the albumen of an egg.

Another object of the invention is to provide a device into which the albumen and yolk of an egg is precipitated, and upon operation of the device the yolk is captured upon disk-like spoon while the albumen freely flows out of the device into some suitable container.

The above and other objects will become apparent in the description below, in which characters of reference refer to like named parts in the drawings.

Referring briefly to the drawings, Figure 1 is a longitudinal sectional elevational view through the separator, showing the spoon in seating position on the container.

Figure 2 is a side elevational view of the same.

Figure 3 is a top plan view of Figure 1.

Referring in detail to the drawings the numeral 10 indicates a drain base provided with a conical face 11 so that any fluid will drain therefrom. This base has a stud 12 extending upwardly therefrom into the confines of an inverted frusto-conical casing 13. At the upper end of the base a concave spoon disk-like 14 is securely anchored.

The casing 13 forms part of the separator, and the edge of the spoon disk 14 is adapted to snugly come into contact with the interior surface of the casing and prevent any leakage in the upper compartment 15 of the casing above the spoon. This casing is urged upwardly by a coil spring 16 which sits upon the face of the base 10 and supports a sleeve 17. This sleeve is slidably mounted upon the stud 12 and is joined to the lower constricted end 18 of the casing 13 by a pair of outwardly curved fingers 19 and 20; said fingers extend from the sleeve in diametrically opposite directions and are secured to an encircling ring 21 which is permanently secured to the constricted end of the cone 13.

The device illustrated in the drawing is adapted to serve as means for separating the yolk from the albumen of an egg, retaining the yolk and conveying the albumen into a suitable container such as a dish in which the device rests. In its normal position the casing 13 is in raised position in which the spoon disk 14 has its edges contacting with the internal face of the casing and in this position, the spoon and casing serve as a perfect receptacle for both the yolk and albumen of an egg. The egg is cracked and the contents thereof are deposited in the compartment 15. Since the yolk is heavier than the albumen the same will sink and come to rest upon the spoon 14. This spoon disk is of sufficient volume to accommodate a single yolk. Separation has not yet occurred. To separate the yolk resting in the spoon 14 from the albumen, the casing is depressed against the resistance of the spring 16, and the albumen will thereafter freely flow out of the constricted mouth 22 of the casing and will drain into the dish in which the device rests, over the conical surface 11 of the base 10. The yolk resting all this time upon the spoon 14 may then be poured into a second container. A device of this type finds special utility in the art of cooking, when cakes or condiments requiring the separation of the yolks from the albumen, are being prepared.

It is to be noted that certain changes in form and construction may be made without departing from the spirit and scope of the invention.

I claim:

1. In a device of the class described, a base, a stud on said base, a spoon mounted on said stud, a frusto-conical casing enveloping said spoon and normally contacting therewith, and yieldable means for normally retaining said spoon in contacting position with said cone.

2. In a device of the class described, a base, a stud on said base, a spoon mounted on said stud, a frusto-conical casing enveloping said spoon and normally contacting therewith, a sleeve slidable on said stud, fingers secured to said sleeve and said casing and yieldable means engaging said sleeve for lifting said casing upwardly to contacting position with said spoon, said casing when lowered being adapted to permit the evacuation out of said casing of the albumen of an egg, the spoon being a receptacle for the yoke of the egg.

3. In a device of the class described, a base, a stud on said base, a spoon mounted on said stud, a frusto-conical casing enveloping said spoon and normally contacting therewith, a sleeve slidable on said stud, fingers secured to said sleeve and said casing, a coil spring seated on said base, and wound about said stud to support said sleeve and said casing, said casing when depressed being adapted to separate the albumen from the yoke of an egg, said casing when lowered being adapted to permit the evacuation out of said casing of the albumen of an egg, said spoon being a receptacle for the yoke of the egg.

In testimony whereof I affix my signature.

WALTER DÄMMRICH.